US008839309B2

(12) United States Patent
Amidei et al.

(10) Patent No.: US 8,839,309 B2
(45) Date of Patent: Sep. 16, 2014

(54) METHODS AND SYSTEMS FOR DISPLAYING CONTEXTUALLY RELEVANT INFORMATION FROM A PLURALITY OF USERS IN REAL-TIME REGARDING A MEDIA ASSET

(71) Applicant: United Video Properties, Inc., Santa Clara, CA (US)

(72) Inventors: William Amidei, La Jolla, CA (US); Paul Jensen, Menlo Park, CA (US); Brian Peterson, Barrington, IL (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/705,837

(22) Filed: Dec. 5, 2012

(65) Prior Publication Data
US 2014/0157296 A1 Jun. 5, 2014

(51) Int. Cl.
*H04N 5/445* (2011.01)
*H04N 21/475* (2011.01)
*H04N 21/462* (2011.01)
*H04N 21/4722* (2011.01)
*G06F 3/00* (2006.01)
*G06F 13/00* (2006.01)
*H04N 7/173* (2011.01)
*G06Q 30/00* (2012.01)
*G06Q 10/00* (2012.01)
*G06Q 30/02* (2012.01)

(52) U.S. Cl.
CPC ....... *H04N 21/4758* (2013.01); *G06Q 30/0245* (2013.01); *G06Q 30/0201* (2013.01); *H04N 7/17318* (2013.01); *H04N 21/4622* (2013.01); *H04N 5/44543* (2013.01); *H04N 21/4722* (2013.01)

USPC ............. 725/61; 725/51; 725/53; 725/109; 725/112; 705/14.44; 705/7.29

(58) Field of Classification Search
CPC .......... H04N 21/4722; H04N 21/4622; H04N 5/44543; H04N 21/4758; G06Q 10/107; G06Q 30/0245; G06Q 30/0201
USPC ............. 725/61, 51, 109, 112, 53; 709/206; 705/14.44, 7.29
See application file for complete search history.

(56) References Cited

U.S. PATENT DOCUMENTS 4,706,121 A    11/1987  Young
5,014,125 A     5/1991  Pocock et al.
(Continued)

FOREIGN PATENT DOCUMENTS

EP    0721253        7/1996
WO    WO-9713368    4/1997
(Continued)

OTHER PUBLICATIONS

U.S. Appl. No. 09/717,729, filed Nov. 21, 2000, Ellis et al.
(Continued)

*Primary Examiner* — Hoang-Vu A Nguyen-Ba
(74) *Attorney, Agent, or Firm* — Ropes & Gray LLP

(57) ABSTRACT

Methods and systems are described herein for quickly and easily displaying supplemental information about an event occurring in a media asset. In some embodiments, a media application may use a content-recognition module to determine the context of an event and distribute itemized tasks to multiple entities in order to generate the supplemental information about the event.

27 Claims, 8 Drawing Sheets

(56) References Cited

U.S. PATENT DOCUMENTS

| | | | |
|---|---|---|---|
| 5,559,548 | A | 9/1996 | Davis et al. |
| 5,589,892 | A | 12/1996 | Knee et al. |
| 5,635,978 | A | 6/1997 | Alten et al. |
| 5,659,350 | A | 8/1997 | Hendricks et al. |
| 5,699,107 | A | 12/1997 | Lawler et al. |
| 5,781,246 | A | 7/1998 | Alten et al. |
| 6,014,184 | A | 1/2000 | Knee et al. |
| 6,081,830 | A | 6/2000 | Schindler |
| 6,239,794 | B1 | 5/2001 | Yuen et al. |
| 6,275,268 | B1 | 8/2001 | Ellis et al. |
| 6,331,877 | B1 | 12/2001 | Bennington et al. |
| 6,357,043 | B1 | 3/2002 | Ellis et al. |
| 6,373,528 | B1 | 4/2002 | Bennington et al. |
| 6,388,714 | B1 | 5/2002 | Schein et al. |
| 6,396,546 | B1 | 5/2002 | Alten et al. |
| 6,418,556 | B1 | 7/2002 | Bennington et al. |
| 6,564,378 | B1 | 5/2003 | Satterfield et al. |
| 6,564,379 | B1 | 5/2003 | Knudson et al. |
| 6,591,292 | B1 | 7/2003 | Morrison et al. |
| 6,698,020 | B1 | 2/2004 | Zigmond et al. |
| 6,742,183 | B1 | 5/2004 | Reynolds et al. |
| 6,756,997 | B1 | 6/2004 | Ward, III et al. |
| 6,766,374 | B2 | 7/2004 | Trovato et al. |
| 6,886,030 | B1 | 4/2005 | Easterbrook et al. |
| 6,898,762 | B2 | 5/2005 | Ellis et al. |
| 7,028,326 | B1 | 4/2006 | Westlake et al. |
| 7,165,098 | B1 | 1/2007 | Boyer et al. |
| 7,552,460 | B2 | 6/2009 | Goldman |
| 7,630,966 | B2 | 12/2009 | Arora |
| 7,761,892 | B2 | 7/2010 | Ellis et al. |
| 7,817,301 | B2 * | 10/2010 | Ohno et al. .................. 358/1.18 |
| 7,941,819 | B2 * | 5/2011 | Stark et al. ...................... 725/45 |
| 8,046,801 | B2 | 10/2011 | Ellis et al. |
| 8,065,286 | B2 * | 11/2011 | Jones ............................ 707/706 |
| 8,146,117 | B2 * | 3/2012 | Knudson et al. ................ 725/39 |
| 2001/0044745 | A1 | 11/2001 | Shaw |
| 2002/0042914 | A1 | 4/2002 | Walker et al. |
| 2002/0049973 | A1 | 4/2002 | Alten et al. |
| 2002/0056088 | A1 | 5/2002 | Silva, Jr. et al. |
| 2002/0078450 | A1 | 6/2002 | Bennington et al. |
| 2002/0095676 | A1 | 7/2002 | Knee et al. |
| 2002/0174430 | A1 | 11/2002 | Ellis et al. |
| 2003/0093790 | A1 | 5/2003 | Logan et al. |
| 2003/0110499 | A1 | 6/2003 | Knudson et al. |
| 2005/0028208 | A1 | 2/2005 | Ellis et al. |
| 2005/0251827 | A1 | 11/2005 | Ellis et al. |
| 2007/0174244 | A1 * | 7/2007 | Jones ................................ 707/3 |
| 2009/0006333 | A1 * | 1/2009 | Jones et al. ........................ 707/3 |
| 2009/0092374 | A1 | 4/2009 | Kulas |
| 2009/0164904 | A1 | 6/2009 | Horowitz et al. |
| 2009/0172150 | A1 | 7/2009 | Alkov et al. |
| 2009/0235298 | A1 | 9/2009 | Carlberg et al. |
| 2012/0016860 | A1 * | 1/2012 | Jones ............................ 707/706 |
| 2012/0084370 | A1 * | 4/2012 | Heywood et al. ............. 709/206 |
| 2012/0271894 | A1 * | 10/2012 | Mirrashidi et al. ........... 709/206 |

FOREIGN PATENT DOCUMENTS

| | | |
|---|---|---|
| WO | WO-9826584 | 6/1998 |
| WO | WO-9843183 | 10/1998 |
| WO | WO-9901984 | 1/1999 |
| WO | WO-9904561 | 1/1999 |
| WO | WO-9935847 | 7/1999 |
| WO | WO-0041390 | 7/2000 |
| WO | WO-2009114134 | 9/2009 |

OTHER PUBLICATIONS

U.S. Appl. No. 09/492,713, filed Jan. 27, 2000, Forrer et al.
U.S. Appl. No. 09/378,533, filed Aug. 20, 1999, McKissick et al.
U.S. Appl. No. 09/357,941, filed Jul. 16, 1999, Knudson et al.
U.S. Appl. No. 09/356,270, filed Jul. 16, 1999, DeWeese et al.
U.S. Appl. No. 09/356,268, filed Jul. 16, 1999, Rudnick et al.
U.S. Appl. No. 09/346,134, filed Jul. 19, 1999, Ellis et al.
U.S. Appl. No. 09/332,244, filed Jun. 11, 1999, Ellis et al.
U.S. Appl. No. 11/324,202, filed Dec. 29, 2005, Yates et al.
U.S. Appl. No. 10/195,228, filed Jul. 11, 2002, Ellis et al.
U.S. Appl. No. 09/110,667, filed Jul. 7, 1998, Boylan et al.
U.S. Appl. No. 09/070,700, filed Apr. 30, 1998, Boylan et al.
U.S. Appl. No. 09/070,604, filed Apr. 30, 1998, Knudson et al.
U.S. Appl. No. 09/034,939, filed Mar. 4, 1998, Knudson et al.

* cited by examiner

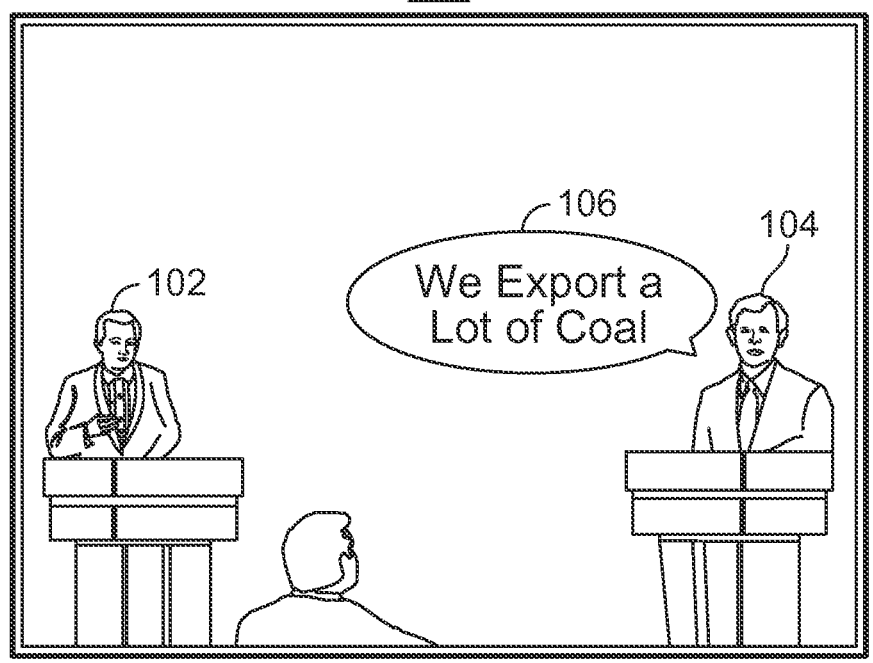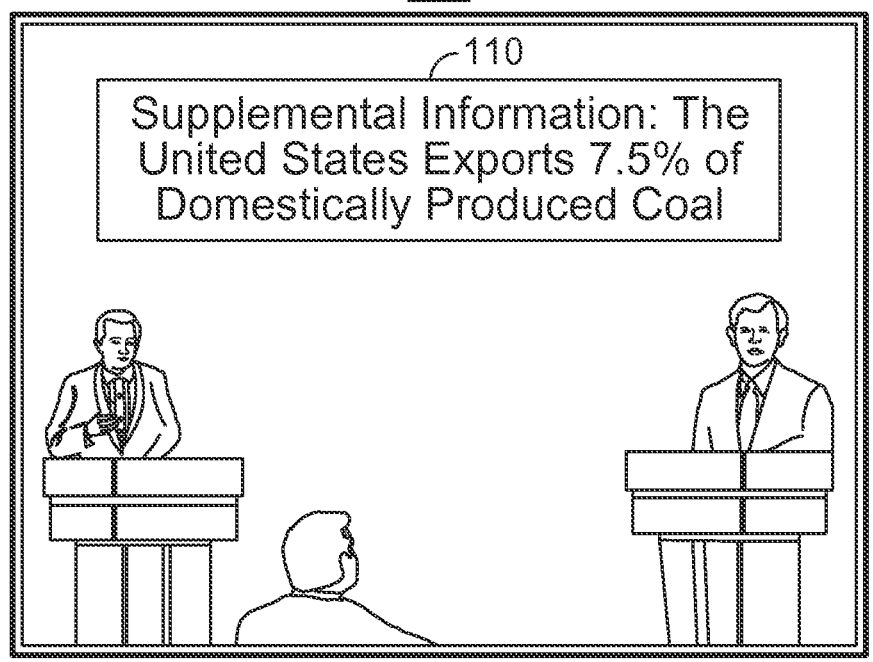
FIG. 1

500

| CONTENT RECOGNITION FILE |
|---|
| 502 — <MEDIA_ASSET_FRAME_NUMBER_DF321JSKA321F> |
| 504 —     <CURRENT_ASSET> POLITICAL_DEBATE</CURRENT_ASSET> |
| 506 —     <ASSET_PROGRESS> 0:34:00 </ASSET_PROGRESS> |
| 508 —     <ASSET_DATETIME> 06-08-12_6:30:00 </ASSET_DATETIME> |
| 510 —     <EVENT_DETAILS> |
| 512 —         <SUBTITLE>SPEAKER_1:THE_US_EXPORTS_10%_OF_OUR_COAL</SUBTITLE> |
| 514 —         <SPEECH_ANALYSIS>US_EXPORTS_10%_OF OUR_COAL</SPEECH_ANALYSIS> |
| 516 —         <VOLUME_ANALYSIS>LOUD</VOLUME_ANALYSIS> |
| 518 —     </EVENT_DETAILS> |
| 520 — </MEDIA_ASSET_FRAME_NUMBER_DF321JSKA321F> |

METHODS AND SYSTEMS FOR DISPLAYING CONTEXTUALLY RELEVANT INFORMATION FROM A PLURALITY OF USERS IN REAL-TIME REGARDING A MEDIA ASSET

BACKGROUND OF THE INVENTION

While viewing media assets (e.g., a television program), users may wish to learn more information about an event (e.g., a statement made by a person appearing in the media asset, the validity of a claim in an advertisement, etc.) occurring in the media asset. While some media assets allow a user to select additional options or added features (e.g., pop-up biographies about the cast and crew), when the added features appear and what topic the added features concern are determined by the content producer and not the user. Furthermore, as the added feature is derived from the content producer, the added feature may be biased or may present limited viewpoints about an event. Therefore, added features provided by a content producer may not provide the added information about an event that a user desires.

In order to gain the added information that a user desires, the user may use additional devices (e.g., a laptop computer) to search (e.g., using an Internet search engine) for more information about the event. However, without knowing the proper context (e.g., who said the statement, what was the tone of the statement, when was the statement said, etc.) of the event or what search terms to use to describe the context of the event (e.g., how to describe the tone of the statement), a user may not be able to determine (even using a search engine) more information about the event. Moreover, the use of general search terms may not provide the accuracy or precision needed by the user. Furthermore, even if a user may eventually determine the information, the effort and time required may distract the user from the media asset.

SUMMARY OF THE DISCLOSURE

Accordingly, methods and systems are described herein for quickly and easily displaying supplemental information about an event occurring in a media asset. In some embodiments, a media application may use a content-recognition module to determine the context of an event in a media asset and distribute itemized tasks to multiple users in order to generate the supplemental information about the event. The context-recognition module prevents the user from being distracted from the media asset (e.g., while the user attempts to describe the context of the event or search for information about the event). In addition, by distributing tasks to multiple entities (e.g., crowd-sourcing), the media application may collect large amounts of information in relatively short periods of time (or in real-time) and aggregate and/or filter the information to generate the supplemental information about the event based on multiple viewpoints and/or sources. By using multiple viewpoints and/or sources, the media application enhances the completeness (e.g., by providing unbiased information) and accuracy of the supplemental information.

For example, when a statement or action is made by a character or person appearing on a media asset (e.g., a television program), a user may request supplemental information about the statement or action. In response, the media application may determine the context of the statement (e.g., who said the statement and to what the statement was referring) or action (e.g., what was the reason for the action). After determining the context of the statement or action, the media application may itemize into tasks the additional information it requires in order to generate the supplemental information. The media application may then transmit requests including the tasks to a plurality of other users. Based on the responses from the plurality of other users, the media application may generate the supplemental information for display to the user.

In some embodiments, a media application may use multiple types of content-recognition modules and/or algorithms to determine the context of an event. For example, the media application may process data associated with the event in order to determine the context of an event. In some embodiments, processing the various types of data may include cross-referencing the data in a database indicating the different contexts the event may have.

In some embodiments, a media application may generate supplemental information about an event in a media asset in response to a user request. In order to generate the supplemental information, the media application may transmit, to multiple users, a request for additional information regarding a context of an event shown in a media asset. Upon receiving messages from the plurality of users that include the requested additional information, the media application may generate the supplemental information associated with the context of the event based on the messages.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative example of a media application that may be used to display supplemental information in accordance with some embodiments of the disclosure;

FIG. 5 is an illustrative example of a data structure that may be used to determine a context of an event in a media asset in accordance with some embodiments of the disclosure;

DETAILED DESCRIPTION OF DRAWINGS

Figure 2:
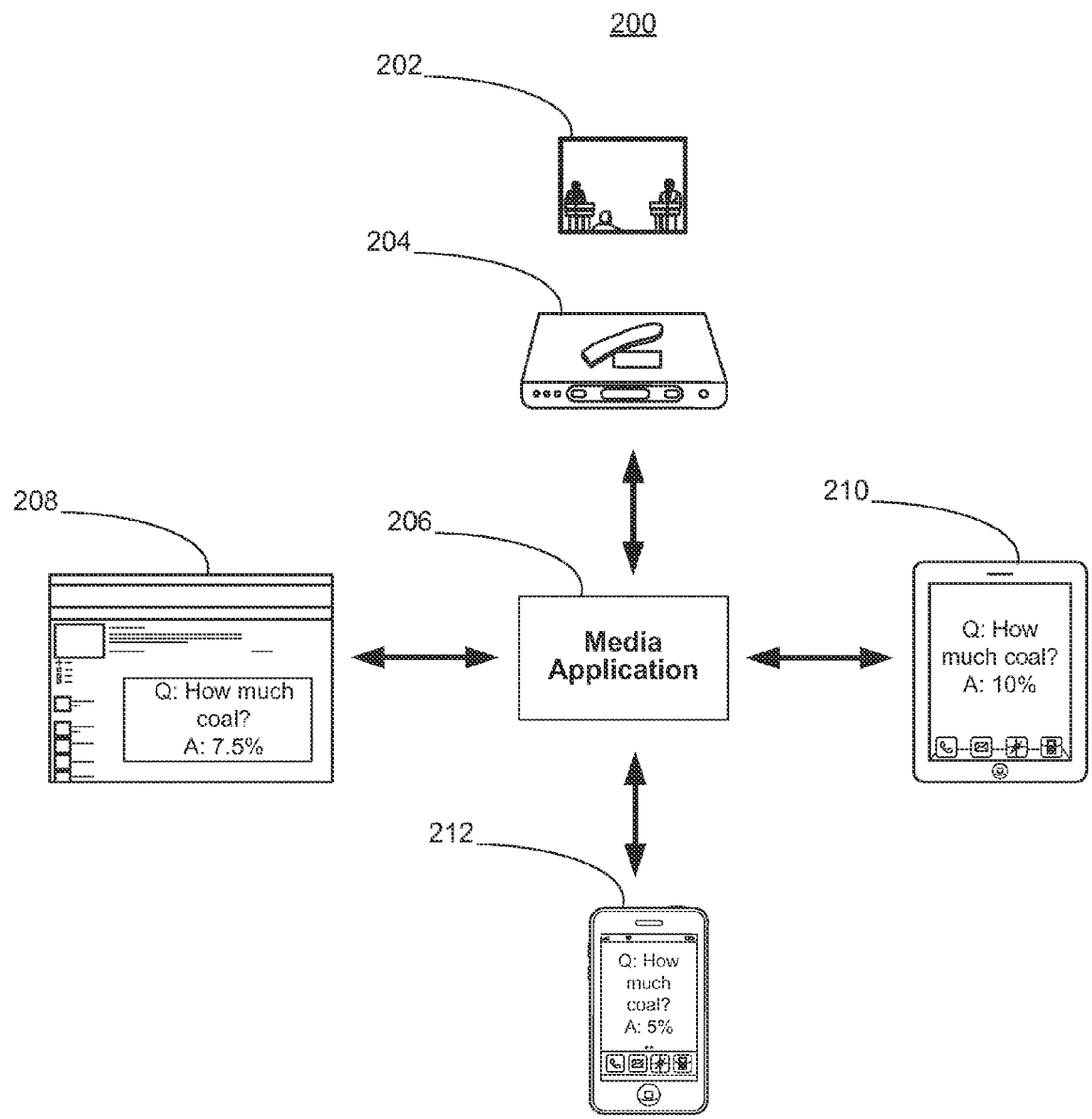
FIG. 2 shows an illustrative example of a system that may be used to generate supplemental information based on additional information provided by a plurality of users in accordance with some embodiments of the disclosure.

Accordingly, methods and systems are described herein for quickly and easily displaying supplemental information about an event occurring in a media asset. The methods and systems described herein alleviate the need for a user to determine the proper context (e.g., who said a statement, what was the tone of the statement, when was the statement said, etc.) of an event in a media asset, or the search terms to use to describe the event (e.g., the proper search terms to describe the tone of the statement), in order to determine more information about the event. In addition, the methods and systems increase the completeness and accuracy of the information compared to information gathered using traditional searching methods (e.g., an Internet search engine), without distracting the user from the media asset.

In some embodiments, a media application may receive a user input from a user device for supplemental information about the context of an event shown in a media asset. The media application may determine additional information required to generate the supplemental information about the context of the event shown in a media asset, and transmit requests for the additional information to one or more users. The media application may receive one or more messages, which include the requested additional information, from the one or more users and generate the supplemental information based on the one or more message. The media application may then instruct the user device to display the supplemental information.

As used herein, "supplemental information" refers to any information related to or associated with an event in a media asset. For example, supplemental information may include, but is not limited to, the verification of a statement or claim in a media asset, further descriptions and/or information about objects or entities shown and/or described in a media asset, and/or any other information, including, but not limited to, a video or audio segment, that may interest a user about an event in a media asset. In some embodiments, the media application may generate supplemental information based on one or more pieces of additional information.

As used herein, "additional information" refers to any information used to generate supplemental information. For example, in an embodiment in which supplement information is the verification of a statement made by a person displayed in a media asset, and a request for the additional information from the media application includes a request for a fact needed to verify the factual basis of the statement, the additional information may be the fact used to verify the statement. For example, if an advertisement claims to have the best product on the market, the media application may use additional information such as the name of the product in question, a list of all other products in the market, and the results of a comparison study of the product in question to all other products to determine whether or not the product is actually the "best" product on the market. Additionally or alternatively, the media application may request industry and/or user reviews related to the event (e.g., reviews indicating the quality of the product). The media application may then use the information in the reviews to generate the supplemental information.

As used herein, an "event" is any action (e.g., a verbal statement, opinion and/or physical movement), segment (e.g., a portion of a news broadcast featuring a particular topic), or other occurrence during a media asset that may be of particular interest to a user. For example, in some embodiments an event may be a statement or gesture made by a character or person in a media asset affirming or denying a claim.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media may be available on these devices, as well. The media provided may be for content available only through a television, for content available only through one or more of other types of user equipment devices, or for content available both through a television and one or more of the other types of user equipment devices. The media applications may be provided as on-line applications (i.e., provided on a website), or as stand-alone applications or clients on user equipment devices. Various devices and platforms that may implement media applications are described in more detail below.

In some embodiments, a media application may transmit, to a plurality of users, a request for additional information regarding a context of an event shown in a media asset. As used herein, a "plurality of users" may include, but is not limited to any device, entity, or source of information that may process a request for additional information. For example, the plurality of users may include a person operating a user equipment device. In some embodiments, the person may receive (e.g., via e-mail, Internet posting, advertisement, or any other applicable information delivery method) the request from the media application for additional information, and in response generate a message (e.g., via a return e-mail, an answer to the Internet posting, a user input in the advertisement, or any other applicable method of transmitting information) that includes the additional information. It should be noted that in some embodiments, transmitting a request to a plurality of users may also include querying one or more databases (e.g., an Internet search engine or any other storage device, including, but not limited to, databases containing previously generated supplemental information and/or additional information) or consulting one or more data gathering services (e.g., a intelligent personal assistant application) for the additional information.

In some embodiments, a media application may use a content-recognition module or algorithm to determine the context of an event and distribute itemized tasks to multiple users in order to generate the supplemental information about the event. The content-recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the objects and/or characteristics in media assets. For example, the media application may receive media assets in the form of a video. The video may include a series of frames. For each frame of the video, the media application may use a content-recognition module or algorithm to determine the context (e.g., the person that is speaking or a facial gesture affirming or denying a statement) of an event occurring during the frame or series of frames.

In some embodiments, the content-recognition module or algorithm may also include speech recognition techniques, including but not limited to Hidden Markov Models, dynamic time warping, and/or neural networks (as described above) to translate spoken words into text. The content-recognition module may also use other techniques for processing audio and/or visual data. For example, the media application may monitor the volume of a statement in a media asset to determine the tone of the statement (e.g., a high volume may indicate an angry tone).

In addition, the media application may use multiple types of optical character recognition and/or fuzzy logic, for example, when determining the context of a keyword(s) retrieved from data (e.g., media data, translated audio data, subtitle data, user-generated data, etc.) associated with the media asset (or when cross-referencing various types of data with databases indicating the different contexts of events as described below). For example, the particular data field may be a textual data field. Using fuzzy logic, the system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, additional information, and/or any other data required for the function of the embodiments described herein. Furthermore, the data fields could contain values (e.g., the data fields could be expressed in binary or any other suitable code or programming language).

As used herein, the "context" of an event refers to the set of circumstances or facts that surround a particular event that influence or affect the meaning of the event. For example, when determining the context of a written and/or spoken statement, the media application may determine who or what authored/stated the statement, the written and/or spoken words and/or other statements that preceded and/or followed the statement, the tone of the statement, and/or any other conditions that may alter the connotation of the statement.

FIG. 1 shows an illustrative example of a media application that may be used to display supplemental information in accordance with some embodiments of the disclosure. Display 100 illustrates a display on a user device displaying a media asset. Display 108 illustrates a display featuring supplemental information as described and/or generated in FIGS. 6-9. It should be noted that display 100 and display 108 may be presented on any of the devices shown in FIGS. 3-4. For example, in some embodiments, display 100 and display 108 may be displayed on user equipment 402, 404, and/or 406 (FIG. 4).

In FIG. 1, display 100 represents a display of a media asset (e.g., a streaming television program) on a user device (e.g., user equipment 402, 404, and/or 406 (FIG. 4)). Display 100 includes entity 102 and entity 104. In display 100, entity 104 is currently speaking as indicated by event 106. As shown in FIG. 1, event 106 is a statement (e.g., "We export a lot of coal") by a person in the media asset.

In some embodiments, display 108 represents the continued display of the media asset on a user device, after a user has requested supplemental information about event 106. For example, a media application may have received a user input (e.g., via user input interface 310 (FIG. 3)) while entity 104 was speaking. Using the systems and methods described herein (e.g., FIGS. 6-9), the media application generated supplemental information 110. Supplemental information 110 represents more information about event 106.

For example, the media application (e.g., media application 206 (FIG. 2)) may have determined the context of event 106. Specifically, the media application may determine via a content-recognition module or algorithm the words spoken and/or actions by the person during the event. Additionally or alternatively, the media application may analyze the words and/or action during a predetermined amount of time (e.g., ten seconds) before and/or after the event (e.g., in order to better understand the context of the event). Furthermore, by cross-referencing the words and/or other information obtained by the content-recognition module (e.g., as discussed below in relation to FIG. 5) with a database, the content-recognition module determines that the term "we," the person in the media asset refers to an organization or body. The content-recognition module or algorithm may also determine that the term "export" refers to shipping goods out of a country. The content-recognition module or algorithm may also determine that the term "a lot" refers to a particular numerical amount. Finally, the content-recognition module or algorithm may also determine that the term "coal" refers to a mineral of fossilized carbon.

The content-recognition module or algorithm may also determine the relationships between words and/or other information obtained by the content-recognition module. For example, by processing the relationship between the words, the media application determines that event 106 is a statement regarding a particular amount of a particular substance shipped out of a particular country. Therefore, the media application determines that the request for supplemental information is likely a request to determine the validity of the statement. The media application then generates the supplemental information.

The media application may also have stored supplemental information generated by previous requests (e.g., supplemental information generated in response to the same or different user viewing the media asset at an earlier date), and display the supplemental information again during the event (either in response to a user input requesting supplemental information or automatically without a user requesting supplemental information).

FIG. 2 shows an illustrative example of a system that may be used to generate supplemental information (e.g., supplemental information 110 (FIG. 1)) based on additional information provided by a plurality of users in accordance with some embodiments of the disclosure. For example, in some embodiments, system 200 may be used to generate supplemental information (e.g., supplemental information 110 (FIG. 1)) on a display (e.g., display 108 (FIG. 1)) of a user device (e.g., user equipment 402, 404, and/or 406 (FIG. 4)). It should be noted that in some embodiments, the devices shown in FIG. 2 may correspond to one or more devices in FIGS. 3-4.

FIG. 2 shows system 200. In system 200, a user is currently accessing a media asset on display 202. In some embodiments, display 202 may correspond to display 100 (FIG. 1)). During an event (e.g., event 106 (FIG. 1)) a user may have requested supplemental information about an event (e.g., event 106 (FIG. 1)) in display 202 using user device 204. Media application 206, which in some embodiments, may be implemented on user device 204 or at a remote location (e.g., supplemental information source 418 (FIG. 4)), receives the request for supplemental information.

Media application 206 determines the context of the event (e.g., who said the statement making up the event and to what the statement was referring). After determining the context of the statement, the media application may itemize into one or more tasks, additional information (e.g., facts) it requires in order to generate the supplemental information (e.g., a verification or correction of the factual basis of the statement). For example, if the event is a statement about the amount of coal that is exported from the United States (e.g., as described in relation to FIG. 1 above), media application 206 may determine the fact required to generate the supplemental information is the exact numerical amount of coal that is exported from the United States. The media application may then transmit requests for the additional information (e.g., a request for the exact numerical amount of coal that is exported from the United States) to a plurality of other users.

In FIG. 2, users operating user device 208, user device 210, and user device 212 represent a plurality of users. Having determined the additional information it requires in order to generate the supplemental information, media application 206 requests the additional information from the plurality of users. In system 200, media application 206 has transmitted the same task (e.g., the same question) to each of the plurality of users. In some embodiments, one or more of the users may receive different tasks. For example, by breaking the additional information into small, independent tasks, media application 206 may increase the speed (e.g., multiple users may work concurrently to solve different parts of a problem) and accuracy (e.g., reducing the tasks to smaller, less complex problems reduces the chance of human error) of the additional information returned by the plurality of users.

In addition, by breaking the additional information into small, independent tasks, the plurality of users may not know to what they are contributing (enhancing the privacy of the user that requested the supplemental information), however, the plurality of users can still be effective in their individual tasks. In addition, by breaking the additional information into small, independent tasks, the media application may more easily outsource the requests for additional information. For example, one or more of the tasks used to generate the additional information may be the same as one or more of the tasks used to generate other additional information (e.g., additional information used to generate different supplemental information in response to a request for supplemental information about the same or a different event issued by the same or a different user). The response to each of the request and/or the additional information may be stored (e.g., on any of the devices accessible by communications network 414 (FIG. 4)) for subsequent retrieval.

Based on the responses, transmitted as messages including the additional information, from the plurality of other users, media application 206 may generate the supplemental information (e.g., supplemental information 110 (FIG. 1)) for display to the user on the user device 204. For example, media application may aggregate, append, and/or compare the additional information in each of the messages received from the plurality of users. The supplemental information may then be generated based on the aggregated, appended, and/or compared additional information (e.g., as described in FIG. 9 below).

In some embodiments, the plurality of users may receive summary information about the event with the request for additional information. (e.g., a video clip of a portion or segment of the media asset, a textual description, etc.), which may help the plurality of users provide additional information. For example, in some embodiments, the media application may instead of (or in addition to) determining the context of an event, determine a particular portion of the event that would be needed for the plurality of users to provide additional information about the event.

For example, the media application may use progress information associated with the progress of the media asset (e.g., line 506 (FIG. 5)) to determine at what point during the progression of the media asset the event occurred, and in response, transmit a portion of the media asset beginning ten second before that point and ending ten seconds after that point. For example, if the event is a statement made by a character or person in a media asset, the media application may determine when the statement began (e.g., the point of progress of the media asset in which the statement began) and ended. The media application may then include the portion containing the entire statement (and the event) in the request for additional information sent to the plurality of users.

The selected portion may include any amount of summary information that the media application determines is necessary for the user or any one of the plurality of users to understand the main action sequence. This summary information (e.g., a portion of the media asset) may be included with the request for additional information (e.g., in a file transmitted with the request), or may be included with the generated supplemental information as a reference for the user. For example, the media application may select a segment of the play length of the media asset or a particular scene of the media asset, which includes the event, for to display to the plurality of users along with the request for additional information.

For example, if an event (e.g., a statement) was in response to a question, the media application may also determine when the question began and ended, and send the entire question (or the play length of the media asset corresponding to the question) to the plurality of users as well. After determining the portion to provide to the plurality of users (e.g., a segment including the ten seconds before and the ten seconds after the event), the media application may provide the summary information of the event and any other material needed by the plurality of users to understand the event and/or request for supplemental information from the user.

In some embodiments, a portion of the media asset containing the event, as selected by the media application, may also include any amount of the play length of the media asset, or any amount of scenes or segments from the media asset. In some embodiments, the portion may include segments of the play length of the media asset or scenes from the media asset that are not adjacent during the normal playback of the media asset. For example, in some embodiments, a portion of the media asset may include one or more sequences or scenes of interest to the plurality of users, even though the particular sequences or scenes are featured at different points in the play length of the media asset. The media application may determine the segments or scenes to include based on a content recognition file (e.g., data structure 500 (FIG. 5)) describing the media asset. For example, if a plot point or other information, which may be relevant to an event is displayed earlier in the media asset, the summary information may include a portion of the media asset displaying the plot point.

In some embodiments, the length of a portion may be determined based on the genre of the media asset. In some embodiments, the length of the portion may depend on a user profile for the user or for anyone of the plurality of users. For example, a user profile and/or a content recognition file (e.g., data structure 500 (FIG. 5)) may indicate that a particular user may require more or less additional content. For example, the user may be aware of particular characters or plot points in the media asset and, therefore, may not require the additional content to introduce those aspects.

In some embodiments, the plurality of users may receive a particular user interface, which organizes the data about the event (e.g., a clip of the actual event, summary information about the event, information about the request for supplemental information issued by the user, etc.). The interface may also include an automatic submission form, which may be used to generate a message, which is sent to the media application.

In some embodiments, the media application may also receive user input from the user requesting the supplemental information that further affects the generation of supplemental information by the media application. For example, the user may request the supplemental information includes particular information (e.g., the factual basis of a statement), may request a multimedia format of the supplemental information (e.g., textual description, a video clip, etc.), may request a form of the supplemental information (e.g., a short description about the event, an Internet link to other sources of information on the event, or a true or false designation about the event) by entering user inputs (e.g., via user input interface 310 (FIG. 3)).

It should be noted that any information or process referred to in this disclosure that is referred to as being in response to a user input may alternatively and/or additionally be performed automatically by the media application (e.g., via control circuitry 304 (FIG. 3)). For example, in some embodiments, a user may request a true or false designation (e.g., an on-screen pop-up box indicating whether an event was true or false). Additionally and/or alternatively, in some embodiments, the true or false designation may appear automatically based on predetermined settings indicating to the media application to display a true or false designation in response to detecting an event.

In some embodiments, an indicator that supplemental information has previously been generated or is currently ready to generate (e.g., a plurality of users are available) may be displayed to a user (e.g., on display 100 (FIG. 1) during the event). The indicator may also indicate the particular information, the multimedia format, and/or the form of supplemental information that is available. An indicator may also appear with the supplemental information (e.g., supplemental information 110 (FIG. 1)), which allows the user to request additional supplemental information or provide feedback/responses (e.g., rating the quality of the supplemental information) to the media application and/or plurality of users.

In some embodiments, a user may also access (e.g., via selection of an indicator and/or automatically upon the supplemental information being generated) summary information about the event. For example, in some embodiments (e.g., when the supplemental information is not generated in real-time), the media asset may have progressed to a different point by the time the supplemental information is ready for display. Therefore, the media application may need to provide a video clip of the event or other summary information, so that the user remembers about what or why the supplemental information was requested.

Figure 3:
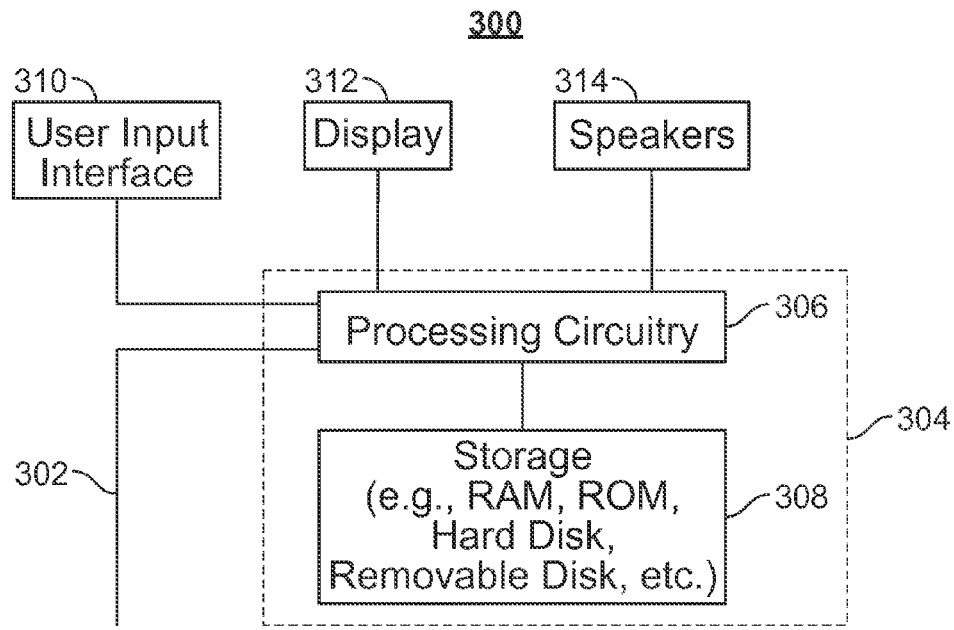
FIG. 3 is a block diagram of an illustrative user equipment device in accordance with some embodiments of the disclosure.
Figure 4:
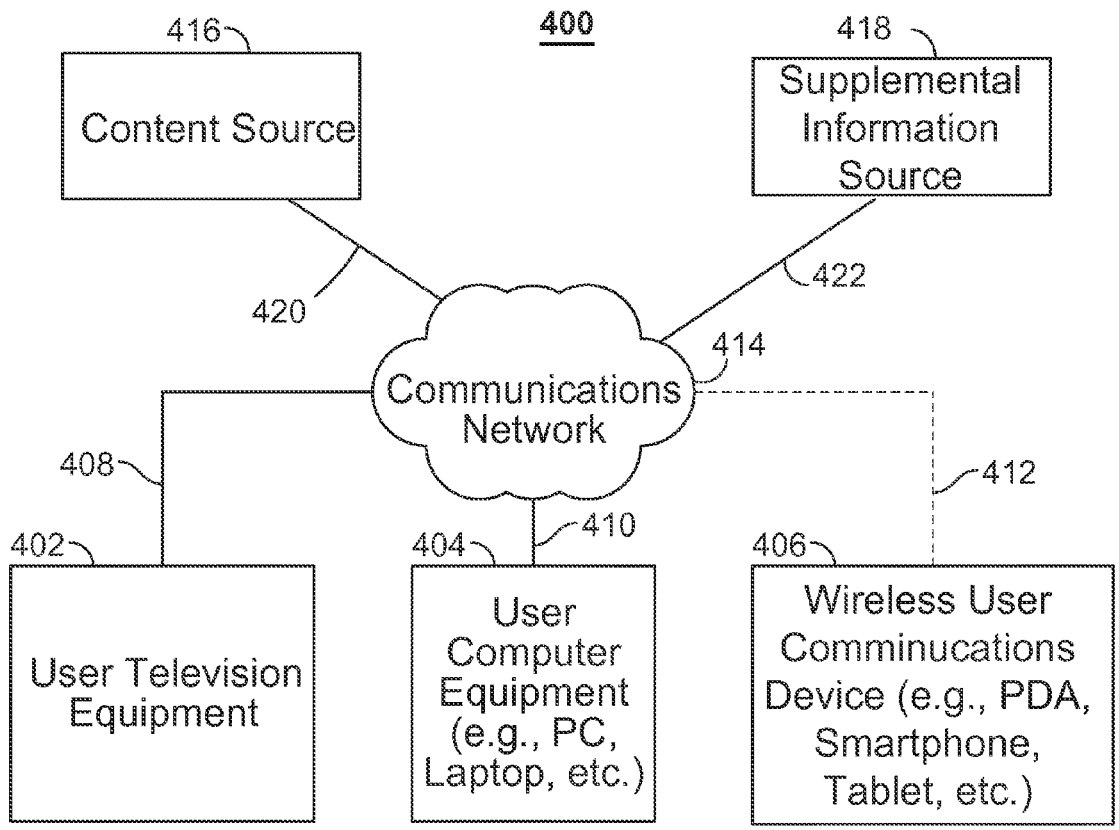
FIG. 4 is a block diagram of an illustrative media system in accordance with some embodiments of the disclosure.

FIG. 3 is a block diagram of an illustrative user equipment device in accordance with some embodiments of the disclosure. It should be noted that the components shown in FIG. 3 may be used to store, receive, transmit, and/or display the media assets, additional information, and/or supplemental information as described herein. For example, media application 206 (FIG. 2) may be implemented on user equipment device 300, and may issue instructions (e.g., displaying supplemental information 110 (FIG. 1)) via control circuitry 304.

Users may access media assets and the media application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate display 100 and 108 (FIG. 1). In some implementations, any action performed by control circuitry 304 may be based on instructions received from the media application and/or media data.

In client-server based embodiments, control circuitry 304 may include communications circuitry suitable for communicating with a media application server or other networks or servers. The instructions for carrying out the above-mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media information, described above, and media application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive media data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server based application. Data for use by a thick or thin client implemented on user equipment device 300 is retrieved on-demand by issuing requests to a server remote to the user equipment device 300. In one example of a client-server based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a stand-alone device or may be part of a network of devices. Various network configurations of devices may be implemented and are discussed in more detail below.

FIG. 4 is a block diagram of an illustrative media system in accordance with some embodiments of the disclosure. It should be noted that the devices shown in FIG. 4 may be used to store, receive, transmit, and/or display the media assets, additional information, and/or supplemental information as shown and described herein. For example, media application 206 (FIG. 2) may be implemented on any of the devices shown in FIG. 4.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and displaying preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable media settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the media experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that, in the exemplary embodiment shown in FIG. 4, it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and supplemental information source 418 coupled to communications network 414 via communication paths 420 and 422, respectively. Paths 420 and 422 may include any of the communication paths described above in connection with paths 408, 410, and 412. Communications with the content source 416 and supplemental information source 418 may be exchanged over one or more communications paths, but are shown as a single path in FIG. 4 to avoid overcomplicating the drawing. In addition, there may be more than one of each of content source 416 and supplemental information source 418, but only one of each is shown in FIG. 4 to avoid overcomplicating the drawing. (The different types of each of these sources are discussed below.) If desired, content source 416 and supplemental information source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Supplemental information source 418 may provide media data, such as the media data described above. Media application data may be provided to the user equipment devices using any suitable approach. In some embodiments, the media application may be a stand-alone interactive television program guide that receives program guide data via a data feed (e.g., a continuous feed or trickle feed). Program schedule data and other media data may be provided to the user equipment on a television channel sideband, using an in-band digital signal, using an out-of-band digital signal, or by any other suitable data transmission technique. Program schedule data and other media data may be provided to user equipment on multiple analog or digital television channels.

In some embodiments, media data from supplemental information source 418 may be provided to users' equipment using a client-server approach. For example, a user equipment device may pull media data from a server, or a server may push media data to a user equipment device. In some embodiments, a media application client residing on the user's equipment may initiate sessions with source 418 to obtain media data when needed, e.g., when the media data is out of date or when the user equipment device receives a request from the user to receive data. Media data may be provided to the user equipment with any suitable frequency (e.g., continuously, daily, a user-specified period of time, a system-specified period of time, in response to a request from user equipment, etc.). Supplemental information source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media applications may be implemented partially as a client application on control circuitry 304 of user equipment device 300 and partially on a remote server as a server application (e.g., supplemental information source 418) running on control circuitry of the remote server. When executed by control circuitry of the remote server (such as supplemental information source 418), the media application may instruct the control circuitry to generate the media application displays and transmit the generated displays to the user equipment devices. The server application may instruct the control circuitry of the supplemental information source 418 to transmit data for storage on the user equipment. The client application may instruct control circuitry of the receiving user equipment to generate the media application displays.

Content and/or media data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media data described above. In addition to content and/or media data, providers of OTT content can distribute media applications (e.g., web-based applications or cloud-based applications), or the content can be displayed by media applications stored on the user equipment device.

Media system 400 is intended to illustrate a number of approaches, or network configurations, by which user equipment devices and sources of content and media data may communicate with each other for the purpose of accessing content and providing media data. The embodiments described herein may be applied in any one or a subset of these approaches, or in a system employing other approaches for delivering content and providing media data. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media data. For example, some users may have home networks that are accessed by in-home and mobile devices. Users may control in-home devices via a media application implemented on a remote device. For example, users may access an online media application on a website via a personal computer at their office, or a mobile device such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more supplemental information sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 is an illustrative example of a data structure that may be used to determine a context of an event in a media asset in accordance with some embodiments of the disclosure. Data structure 500 may be used to provide the display 108 as shown in FIG. 1 and/or described in relation to FIGS. 6-9. It should be noted that data structure 500 or any data therein, could be stored, generated, transmitted, and/or received by any of the devices shown in FIGS. 3-4. For example, data structure 500 may be processed by control circuitry 304 (FIG. 3) as instructed by a media application implemented on user equipment 402, 404, and/or 406 (FIG. 4), content source 416 (FIG. 4), and/or any device accessible by communications network 414 (FIG. 4).

In some embodiments, the media application may generate data structure 500. For example, using a content-recognition module, the media application may determine the context of an event in a media asset. Additionally or alternatively, the media application may generate a data structure (e.g., generate data structure 500) about a predetermined amount of time (e.g., ten seconds) before and/or after the event. In some embodiments, data structure 500 may be transmitted to the media application (e.g., from supplemental information source 418 (FIG. 4), and/or any device accessible via communications network 414 (FIG. 4)). For example, in some embodiments, the content-recognition module may be located on a remote server (e.g., supplemental information source 418 (FIG. 4)).

Data structure 500 includes multiple lines of code. It should be noted that the data (e.g., represented by the various lines of code) displayed in data structure 500 is not limiting, and in some embodiments, the data as described in data structure 500 may be replaced or supplemented by other data as discussed in the disclosure. Lines 502 through 524 indicate to the media application that data structure 500 relates to a media asset.

Lines 504 through 508 indicate to the media application the information about the media asset such as the title or subject matter description (e.g., line 504), the current point of progression (e.g., line 506), and the date and time of the broadcast or transmission of the media asset (e.g., line 508). In some embodiments, the media application may use this information to create reference points for determining the context on an event. For example, the media application may determine that because the media asset is a political debate (e.g., as indicated by line 504) that an event, of the context of the event, occurring in the media asset (e.g., a statement) is likely to be related to politics.

Line 510 through line 518 indicate to the media application the event details (e.g., for a segment or time interval) of the media asset such as who said a particular statement (e.g., line 512), what was said (e.g., line 514), and the tone/volume of what was said (e.g., line 516). In some embodiments, line 510 through 518 may represent the product of content-recognition applied to various types of data associated with the media asset such as subtitle data (e.g., line 512) and audio data (e.g., line 514 and line 516). In some embodiments, the data included in data structure 500 may be cross-referenced (e.g., by media application 206 (FIG. 2)) with a database (e.g., located at supplemental information source 418 (FIG. 4)) to determine the context of an event (e.g., as described in FIG. 8 below).

Additionally or alternatively, data structure 500 may be transmitted with a media asset (e.g., as metadata). For example, data structure 500 may be generated at content source 416 (FIG. 4) before the transmission of the media asset. Data structure 500 may then be transmitted with (or transmitted before and stored in local (e.g., storage 308 (FIG. 3)) or remote (e.g., supplemental information source 418 (FIG. 4)) storage as media data describing the contexts of events occurring in the media asset. Instead of processing the media asset using the content-recognition module when a user requests supplemental information, the media application may reference data structure 500 to determine the context of an event in the media asset. For example, in some embodiments, data structure 500 may describe the context of each event in the media asset during the progression of the media asset.

Figure 6:
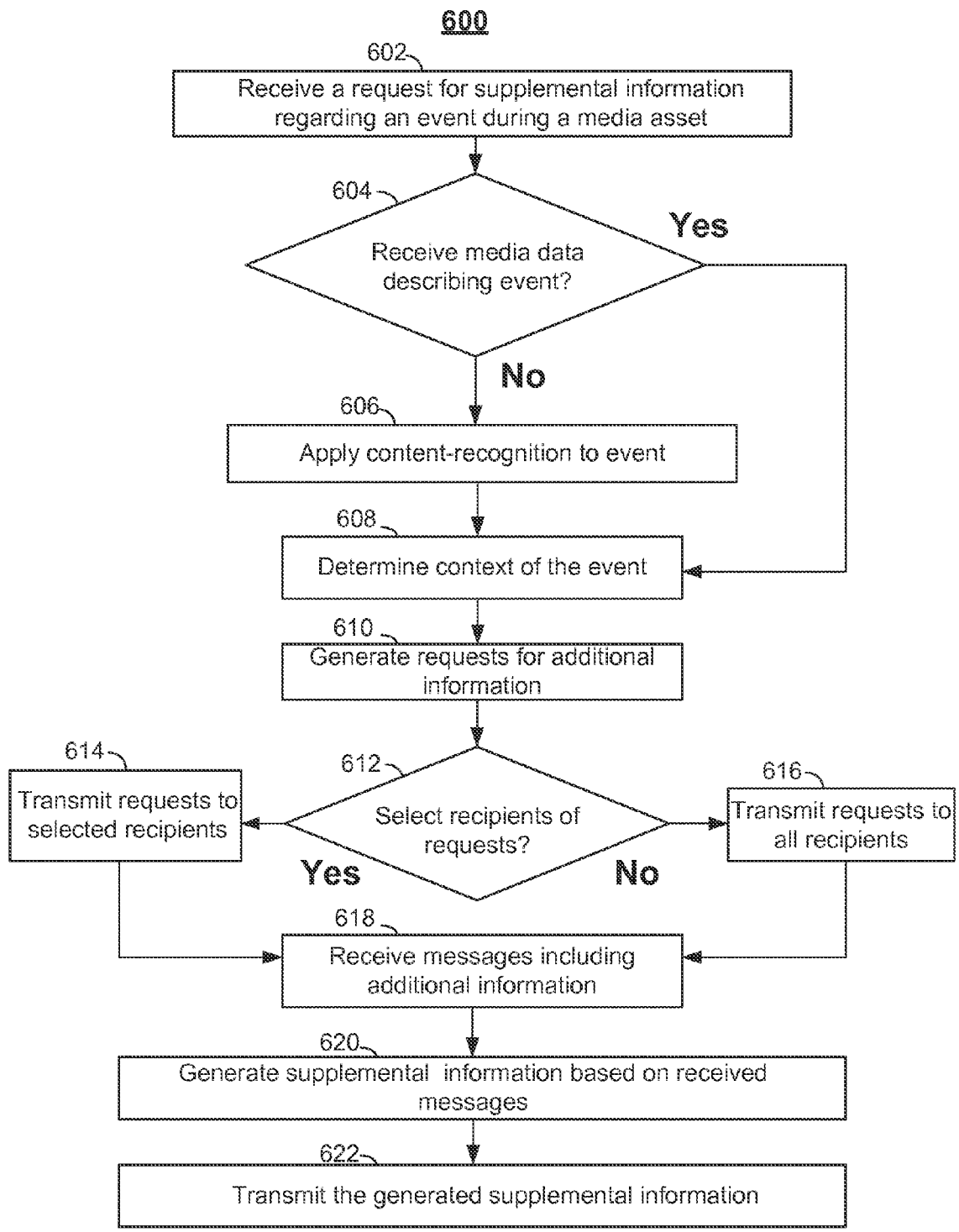
FIG. 6 is a flowchart of illustrative steps for transmitting generated supplemental information to a user in response to receiving a user request for the supplemental information in accordance with some embodiments of the disclosure.

FIG. 6 is a flowchart of illustrative steps for transmitting generated supplemental information to a user in response to receiving a user request for the supplemental information in accordance with some embodiments of the disclosure. Process 600 may be used to provide supplemental information (e.g., supplemental information 110 (FIG. 1)). It should be noted that process 600 or any step thereof, could be displayed on, or provided by, any of the devices shown in FIGS. 3-4. For example, process 600 may be executed by control circuitry 304 (FIG. 3) as instructed by the media application (e.g., media application 206 (FIG. 2)).

At step 602, the media application (e.g., media application 206 (FIG. 2)) receives a request for supplemental information regarding an event during a media asset. For example, the media application may receive a user input (e.g., via user input interface 310 (FIG. 3)) during an event (e.g., event 106 (FIG. 1)) in a media asset displayed in a display (e.g., display 100 (FIG. 1)) on a user device (e.g., user equipment 402, 404, and/or 406 (FIG. 4)).

At step 604, the media application (e.g., media application 206 (FIG. 2)) determines whether or not media data (e.g., metadata transmitted with the media asset) describes the event. For example, in some embodiments, a content provider (e.g., content source 416 (FIG. 4)) may provided media data describing the media asset and any event that may occur during the media asset. If so, the media application proceeds to step 608.

If not, the media application proceeds to step 606. At step 606, the media application (e.g., media application 206 (FIG. 2)) applies a content-recognition module and/or algorithm to the event. In some embodiments, the media application may use multiple types of content-recognition modules and/or algorithms as described herein to determine the context on an event. In some embodiments, processing the various types of data may include cross-referencing the data in a database indicating the different contexts the event may have. In some embodiments, the media application may apply one or more steps found in process 800 of FIG. 8 below.

At step 608, the media application (e.g., media application 206 (FIG. 2)) determines the context of an event. For example, the media application may determine the meaning or circumstances surrounding an event (e.g., event 106 (FIG. 1)). In some embodiments, step 602, may correspond with step 810 of FIG. 8 below.

At step 610, the media application (e.g., media application 206 (FIG. 2)) generates requests for additional information. In some embodiments, after determining the context of the statement, the media application may itemize into tasks the additional information it requires in order to generate the supplemental information. The itemized tasks may then be included in requests for additional information. For example, the media application may perform one or more steps described in FIGS. 7 and 9 below.

At step 612, the media application (e.g., media application 206 (FIG. 2)) selects the recipients (e.g., user device 206, user device 208, and user device 210 (FIG. 2)) of the request. For example, the media application may send the request to a specific group (e.g., people or sources belonging to a social network associated with the user, people or sources known to be experts in the subject matter of the event, or people or sources selected based on any other criteria) at step 614 (e.g., to control the quality and/or quantity of the responses to the requests), or the media application may publish the request to everyone (e.g., posting the request on a website with unrestricted access) at 616 (e.g., to increase the number of responses or the speed in which the responses are received).

At step 618, the media application (e.g., media application 206 (FIG. 2)) receives messages from the recipients of the requests (e.g., users operating user device 206, user device 208, and user device 210 (FIG. 2)). In some embodiments, the messages from the recipients include the additional information (e.g., a fact or vote used to generate the supplemental information). The media application may use control circuitry 304 (FIG. 3) to aggregate, append, and/or compare the messages as described in FIG. 9 below to generate the supplemental information based on the received messages in step 620.

At step 622, the media application (e.g., media application 206 (FIG. 2)) transmits the generated supplemental information for display on a user device (e.g., user equipment 402, 404, and/or 406 (FIG. 4)). In some embodiments, the media application may be implemented on a device remote from the user device (e.g., on supplemental information source 418 (FIG. 4)) or may be implemented on a local device (e.g., user equipment 402, 404, and/or 406 (FIG. 4)).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
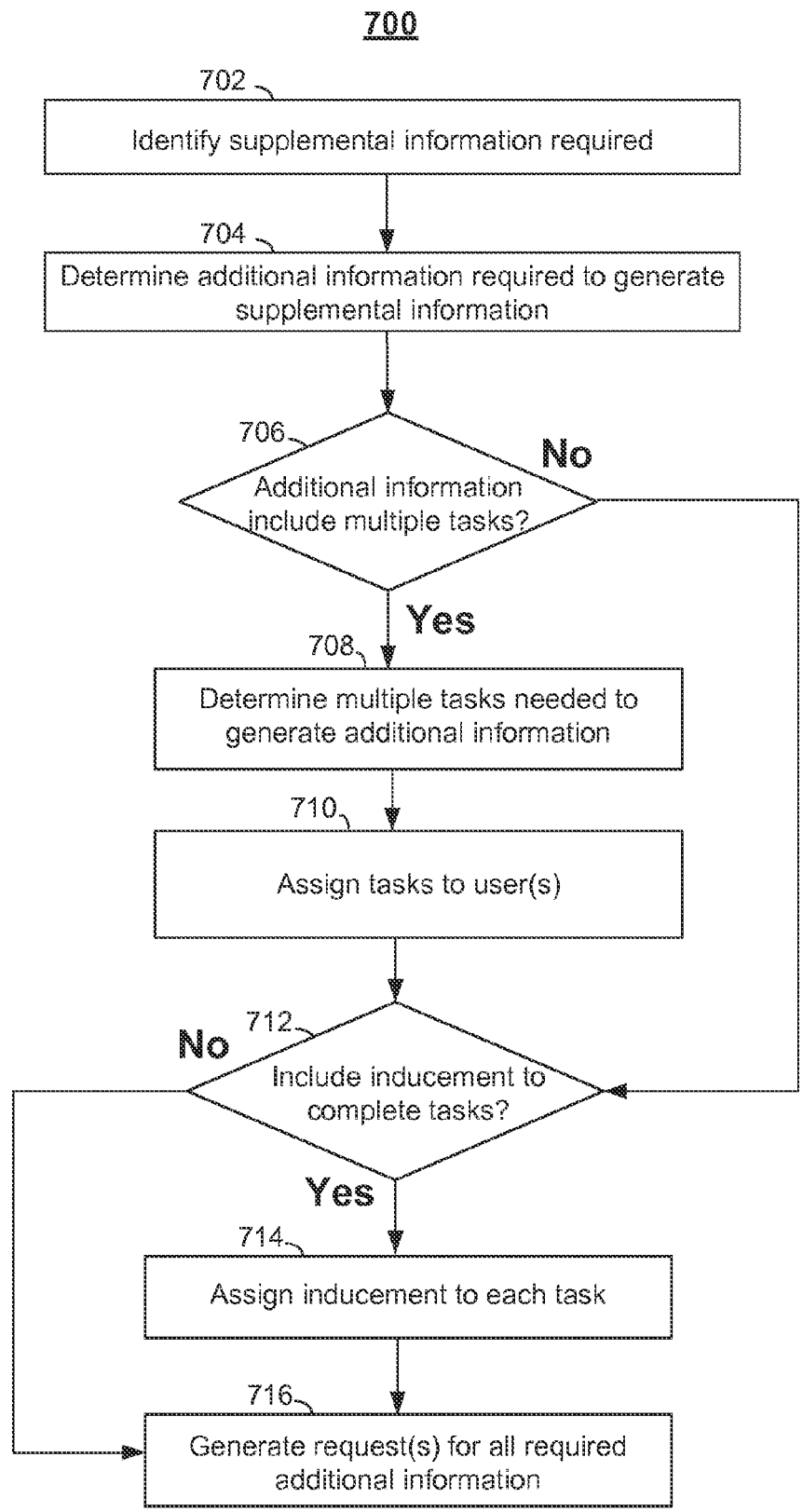
FIG. 7 is a flowchart of illustrative steps for distributing itemized tasks to multiple users in order to generate supplemental information about an event in a media asset in accordance with some embodiments of the disclosure.

FIG. 7 is a flowchart of illustrative steps for distributing itemized tasks to multiple users in order to generate supplemental information about an event in a media asset in accordance with some embodiments of the disclosure. Process 700 may be used to provide supplemental information (e.g., supplemental information 110 (FIG. 1)). It should be noted that process 700 or any step thereof, could be displayed on, or provided by, any of the devices shown in FIGS. 3-4. For example, process 700 may be executed by control circuitry 304 (FIG. 3) as instructed by the media application (e.g., media application 206 (FIG. 2)).

At step 702, the media application (e.g., media application 206 (FIG. 2)) identifies supplemental information required. For example, a content-recognition module or algorithm may determine the relationships between words and/or other information obtained by the content-recognition module. For example, by processing the data regarding an event, the media application may determine the event (e.g., event 106 (FIG. 1)) is a statement. Therefore, the media application determines that the request for supplemental information is likely a request to determine the validity of the statement. The media application may determine the likelihood based by cross-referencing the determined event to a database indicating likely user requests for determined events. In some embodiments, the database may be incorporated into or accessible by any of the devices in FIGS. 2-4. For example, in some embodiments, the database may be located on supplemental information database 418 (FIG. 4).

At step 704, the media application (e.g., media application 206 (FIG. 2)) determines additional information required to generate the supplemental information. For example, if the basis of the request in step 702 is to determine the validity of a statement, the media application determines the fact(s) needed to validate the statement.

At step 706, the media application (e.g., media application 206 (FIG. 2)) determines whether or not determining the additional information includes multiple tasks. For example, as discussed in relation to FIG. 2 above, by breaking the additional information into small, independent tasks, the media application may increase the speed (e.g., multiple users may work concurrently to solve different parts of a problem) and accuracy (e.g., reducing the tasks to smaller, less complex problems reduces the chance of human error) of the additional information returned by the plurality of users. If the media application does not itemize the tasks (e.g., the media application is unable to itemize the additional information into tasks), the media application proceeds to step 712.

If the media application (e.g., media application 206 (FIG. 2)) determines that determining the additional information includes multiple tasks, the media application determines the multiple tasks needed to generate the additional information at step 708. In some embodiments, the media application may use control circuitry 304 (FIG. 3) to itemize into tasks the additional information it requires in order to generate the supplemental information for display (e.g., in display 108 (FIG. 1)) on a user device (e.g., user equipment 402, 404, and/or 406 (FIG. 4)). At step 712, the media application (e.g., media application 206 (FIG. 2)) assigns the tasks to one or more users (e.g., users operating user device 206, user device 208, and user device 210 (FIG. 2)).

At step 712, the media application (e.g., media application 206 (FIG. 2)) determines whether or not to include inducements to complete the tasks. For example, in some embodiments, the media application (e.g., using control circuitry 304 (FIG. 3)) may issue instructions to offer a monetary sum or other prize in response to one or more of the users (e.g., users operating user device 206, user device 208, and user device 210 (FIG. 2)) providing additional information. If the media application determines not to include inducements, the media application generates a request or requests for all the required additional information at step 716. If the media application determines to include inducements, the media application assigns (e.g., using control circuitry 304 (FIG. 3)) an inducement to each task at step 714 before proceeding to step 716. In some embodiments, the inducement assigned for each task may be determined based on data from supplemental information source 418 (FIG. 4), may be determined by a user (e.g., via user input interface 310 (FIG. 3)), or may be based on negotiations (e.g., with users operating user device 206, user device 208, and user device 210 (FIG. 2)).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
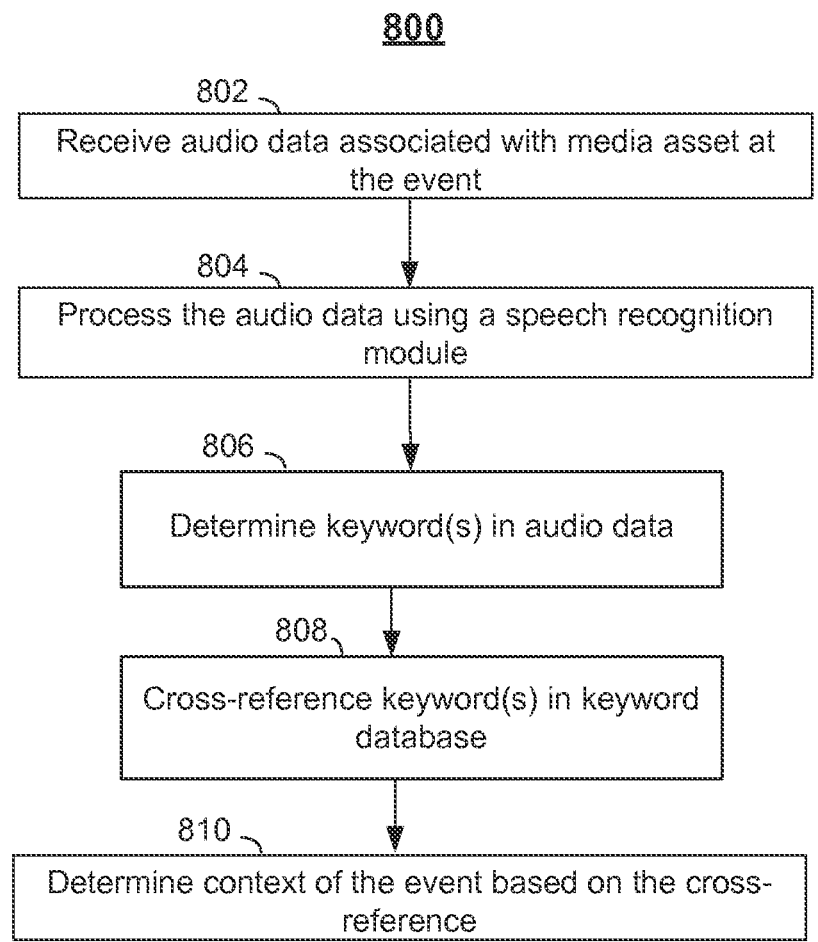
FIG. 8 is a flowchart of illustrative steps for determining the context of an event using a content-recognition module in accordance with some embodiments of the disclosure.

FIG. 8 is a flowchart of illustrative steps for determining the context of an event using a content-recognition module in accordance with some embodiments of the disclosure. Process 800 may be used to provide supplemental information (e.g., supplemental information 110 (FIG. 1)). It should be noted that process 800 or any step thereof, could be displayed on, or provided by, any of the devices shown in FIGS. 3-4. For example, process 800 may be executed by control circuitry 304 (FIG. 3) as instructed by the media application (e.g., media application 206 (FIG. 2)).

At step 802, the media application (e.g., media application 206 (FIG. 2)) receives audio data associated with the media asset at the event. For example, in some embodiments, the audio data received may be included in a data structure (e.g., data structure 500 (FIG. 5) and describe an event (e.g., event 106 (FIG. 1) occurring on a display (e.g., display 108 (FIG. 1)) on a user device (e.g., user equipment 402, 404, and/or 406 (FIG. 4)). In some embodiments, other types of data or combinations of other types of data may also be used. For example, the media application may retrieve subtitle data, visual data, and/or user generated data (e.g., posts on a social networking website) to determine the context of an event.

For example, the user may be accessing an advertisement on a display device. During the advertisement, a speaker in the advertisement may make a claim about an advertised product. In response, the user may request supplemental information (e.g., user and/or industry reviews about the product) using a user input (e.g., user input interface 310 (FIG. 3)).

At step 804, the media application (e.g., media application 206 (FIG. 2)) processes the audio data using a speech recognition module. For example, by processing the event (e.g., event 106 (FIG. 1) using a speech recognition module, the media application may determine particular words or phrases that were spoken during the event. For example, the media application may process event 106 (FIG. 1) to determine that the words "we export a lot of coal" were spoken. In the advertisement example above, the media application may process the claim made by the speaker in the advertisement about the product. The speech recognition module may determine what the speaker said. Additionally or alternatively, the media asset may determine the type (e.g., a commercial) of the media asset to better estimate the context of an event (e.g., a product claim). In some embodiments, upon determining that the type of the media asset is an advertisement, the media application may institute an automatic quick search to retrieve product comparisons and customer or industries reviews.

At step 806, the media application (e.g., media application 206 (FIG. 2)) determines one or more keywords in the audio data. For example, the media application may use multiple types of optical character recognition and/or fuzzy logic, for example, when determining the context of a keyword(s) retrieved. In some embodiments, keywords from other types of data (e.g., media data, translated audio data, subtitle data, user-generated data, etc.) may also be determined. In some embodiments, the media application may transmit the audio data (e.g., audio data include in data structure 500 (FIG. 5)) to a remote server (e.g., supplemental information source 418 (FIG. 4) for processing). In some embodiments, the media application may process the information using control circuitry 304 (FIG. 3) on a user device (e.g., user equipment 402, 404, and/or 406 (FIG. 4). In the advertisement example above, the media application may transcribe what the speaker said to generate one or more keywords regarding the claim and the product.

At step 808, the media application (e.g., media application 206 (FIG. 2)) cross-references the one or more keywords (e.g., one or more words in event 106 (FIG. 1)) in a keyword database that indicates the context of the keywords. In some embodiments, other types of data may also be cross-referenced databases indicating the context of the particular type of data. For example, user-generated data (e.g., being transmitted and/or published during a media asset) may indicate the context of an event (e.g., a mircoblog posts describing the event). This user-generated data may be used to further determine the context of an event. For example, if several Internet posts occur at the same time as the event and/or are directed towards the media asset, the media application may determine that the Internet posts are related to the event. In such a case, the data (e.g., textual comments) in the Internet posting may be used to determine the context of the event. At step 810, the media application (e.g., media application 206 (FIG. 2)) determines the contest of the event based on the cross-reference. In some embodiments, step 810 may correspond to step 608 (FIG. 6).

In the advertisement example above, the media application may cross-reference the determined keywords with a database of keywords found in advertisements and/or other media assets to determine the context of the claim. The media application may then generate requests for additional information in order to generate supplemental information as described in some embodiments in this disclosure. For example, the media application may request user and/or industry reviews, customer surveys, or other information from a plurality of users (e.g., as described in FIG. 2 below) that may be used to generate supplemental information (e.g., verifying the accuracy of the claim as described in relation to FIG. 7). The additional information may then be combined as described below in FIG. 9 in order to generate supplemental information (e.g., supplemental information 110 (FIG. 1)).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

Figure 9:
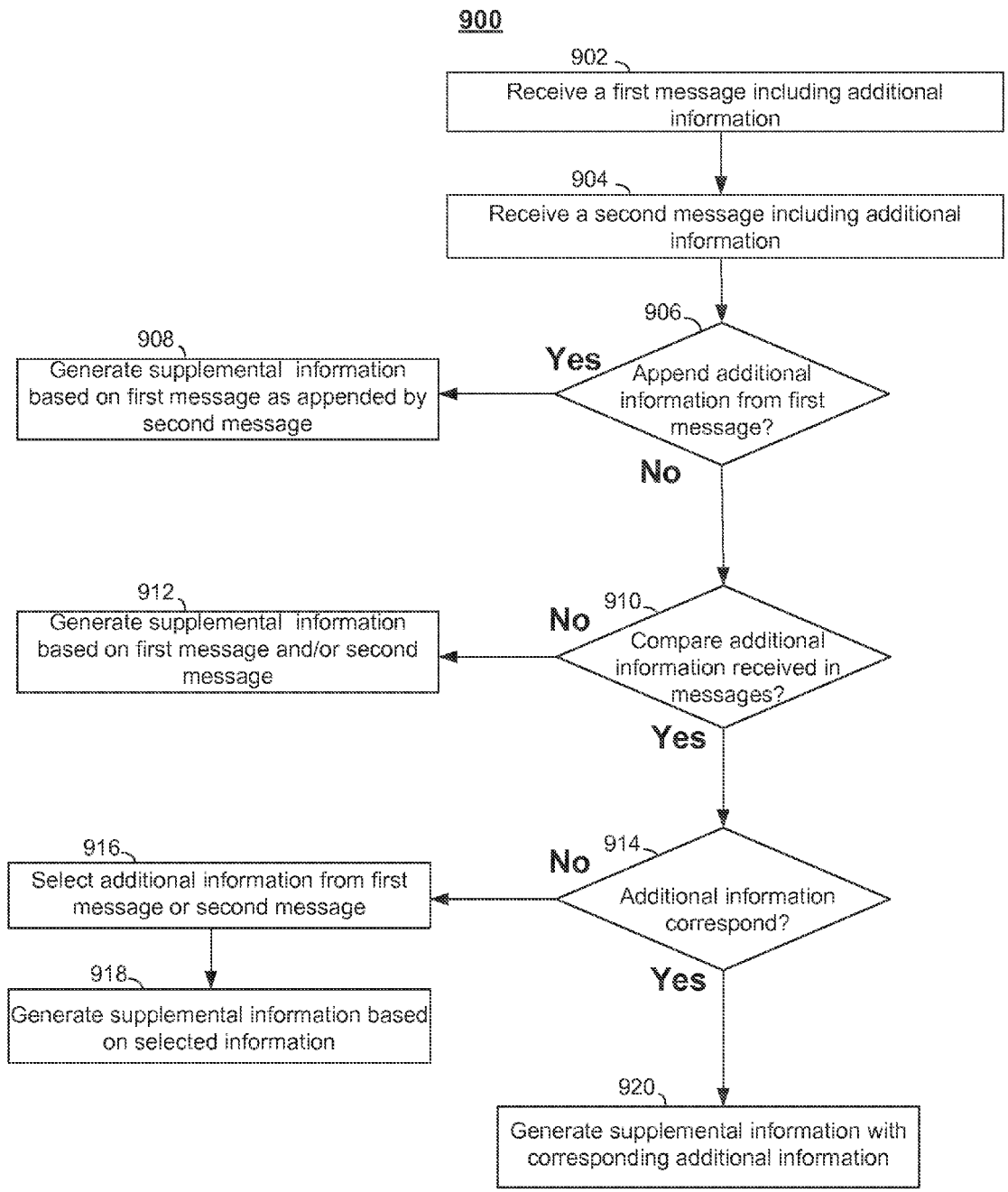
FIG. 9 is a flowchart of illustrative steps for generating supplemental information based on additional information provided by a plurality of users in accordance with some embodiments of the disclosure.

FIG. 9 is a flowchart of illustrative steps for generating supplemental information based on additional information provided by a plurality of users in accordance with some embodiments of the disclosure. Process 900 may be used to provide supplemental information (e.g., supplemental information 110 (FIG. 1)). It should be noted that process 900 or any step thereof, could be displayed on, or provided by, any of the devices shown in FIGS. 3-4. For example, process 900 may be executed by control circuitry 304 (FIG. 3) as instructed by the media application (e.g., media application 206 (FIG. 2)).

At step 902, the media application (e.g., media application 206 (FIG. 2)) receives a first message including additional information, and at step 904, the media application (e.g., media application 206 (FIG. 2)) receives a second message including additional information. For example, the media application may have received responses from a request for additional information (e.g., as described in relation to step 614 and step 616 (FIG. 6)) from one of a plurality of users (e.g., users operating user device 206, user device 208, and user device 210 (FIG. 2)). In some embodiments, step 902 may correspond to step 618 (FIG. 6).

At step 906, the media application (e.g., media application 206 (FIG. 2)) determines whether or not to append additional information from the second message onto the first. For example, in order to generate the supplemental information, the media application (e.g., using control circuitry 304 (FIG. 3)) may need to aggregate multiple messages, each containing additional information. If the media application determines to append the additional information from the first message with the additional information from the second message, the media application generates the supplemental information for display (e.g., in display 108 (FIG. 1)) on a user device (e.g., user equipment 402, 404, and/or 406 (FIG. 4)) based on the first message as appended by the second message at step 908. For example, a message may indicate additional information about an event. A second message may include different information about the event. Instead of determining whether or not one of the messages included incorrect information, the media application may include the additional information in both messages. In some embodiments, appending information may provide supplemental information that is generated from multiple viewpoints.

In another example regarding an advertisement, the messages may include user reviews and/or product comparisons for a product related to an event (e.g., a statement in an advertisement that the product is the "best"). Instead of determining whether or not one of the messages is better (e.g., determining which user review more accurately portrays whether or not the product is the "best"), the media application may include the user reviews from both messages.

For example, the media application may monitor the content being viewed to determine whether the content corresponds to a product advertisement. Specifically, the media application may retrieve a data structure associated with the content being viewed to identify a product being discussed as part of the event. The media application may in response to identifying the product automatically execute a search over one or more databases (e.g., over the Internet) for reviews associated with the identified product. The media application may also use the data structure to identify similar products to the product being discussed in the event. The media application may automatically retrieve a plurality of reviews associated with the similar products by executing a search over one or more databases (e.g., over the Internet). After retrieving the reviews for the product being discussed in the event and the plurality of reviews for the similar products, the media application may compare the retrieved reviews for the identified product with the reviews for the similar products. The media application may determine based on the comparison whether a value, indicating a level of like for the product, associated with any one of the reviews of the similar products exceeds a value, indicating a level of like for the product, associated with the identified product. When the value of any similar product review exceeds the value of the identified product review, the media application may determine that the advertised product in the content is not the "best" and may generate for display an indicator indicating the product is not the best and that the statement is false and identifying at least one of the similar products having a review with a review value greater than the review value of the advertised product. When the value of none of the similar products review exceeds the value of the identified product review, the media application may determine that the advertised product in the content is the "best" and may generate for display an indicator indicating the product is the best and that the statement is true.

If the media application (e.g., media application 206 (FIG. 2)) determines not to append the additional information from the first message with the additional information from the second message, the media application determines whether or not to compare the additional information received in the messages at step 910. For example, in the case that multiple messages were received for the same task (e.g., a task create in relation to process 700 (FIG. 7)), the media application may compare the additional information in each message for accuracy. For example, different users (e.g., users operating user device 206, user device 208, and user device 210 (FIG. 2)) may have provide different additional information. The media application may determine the additional information (e.g., a value) that was provided by the most users and use that additional information to generate the supplemental information.

In some embodiments, the media application may have predetermined threshold levels of accuracy. For example, the media application may determine that additional information is accurate upon receiving a predetermined number of messages including the same information or values. Additionally or alternatively, the media guidance application may use statistical analysis to determine within a particular sampling error whether or not a value or information provided is accurate. For example, upon receiving a threshold number of responses (e.g., one-hundred), the media guidance application may determine that a value or information received is correct upon receiving a particular percentage of the same response (e.g., seventy-five percent). Seventy-five responses out of one-hundred total responses indicating a particular value may achieve the predetermined level of accuracy required by the media application.

For example, in the advertisement example above, the media guidance application may determine that a value received (e.g., a numerical rating of a product) is correct upon receiving a particular percentage or a threshold amount of messages featuring the same value.

If the media application determines to compare the received messages, the media application proceeds to step 914. If the media application determines not to compare the received messages, the media application proceeds to step 912 and generates the supplemental information for display (e.g., in display 108 (FIG. 1)) on a user device (e.g., user equipment 402, 404, and/or 406 (FIG. 4)) based on first message and/or second message. For example, the media application may transmit one supplemental information (e.g., as described in step 622 (FIG. 6)) generated using only additional information from the first message or only additional information from the second message. Additionally or alternatively, the media application may generate supplemental information using only additional information from the first message and generate supplemental information using only additional information from the second message, and transmit both to the user.

At step 914, the media application (e.g., media application 206 (FIG. 2)) determines whether or not the additional information received from the first message and the second message correspond. If so, the media application generates supplemental information with corresponding additional information at step 920. For example, upon comparing the additional information received in the messages, the media application determines whether the additional information in each message is the same. If the additional information is the same, the media application proceeds to generate the supplemental information for display (e.g., in display 108 (FIG. 1)) on a user device (e.g., user equipment 402, 404, and/or 406 (FIG. 4)).

If the media application (e.g., media application 206 (FIG. 2)) determines that the additional information received from the first message and the second message do not correspond, the media application selects additional information from either the first message or second message at step 916. In some embodiments, the media application may select the additional information that is user-based on one or more criteria (e.g., a rating associated with the author of the additional information). At step 918, the media application proceeds to generate the supplemental information based on the selected information for display (e.g., in display 108 (FIG. 1)) on a user device (e.g., user equipment 402, 404, and/or 406 (FIG. 4)).

For example, in the advertisement example above, the media application may select the user review that was from a more trusted author. For example, the media application may compare a user profile (e.g., containing ratings associated with user reviews generated by the user) associated with each of the plurality of users to determine whether or not the media application should display the user review from that particular user from the plurality of users. If the user profile indicates a high rating (e.g., the user has written numerous reviews), the media application may use the additional information received in the message provided by the corresponding user. If the user profile indicates a low rating (e.g., previous user reviews by this user have been flagged as offensive), the media application may not use the additional information received in the message provided by the corresponding user.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for providing supplemental content associated with a media asset, the method comprising:
    transmitting, to a plurality of users, a request for additional information regarding a context of an event in a media asset, wherein the event is a statement during the media asset, and wherein the additional information includes data used to determine a factual basis of the statement;
    receiving messages from the plurality of users that include the additional information;
    generating supplemental information associated with the context of the event based on the messages, wherein the generated supplemental information is based on a comparison of the additional information included in the messages from the plurality of users; and
    generating for display the generated supplemental information on a user device.

2. The method of claim 1, further comprising:
receiving a user input from the user device for the supplemental information about the context of the event in a media asset;
determining the additional information required to generate the supplemental information about the context of the event in the media asset; and
generating the request for the additional information.

3. The method of claim 1, wherein the generating supplemental information further comprises:
receiving a first message that includes a first portion of the additional information;
receiving a second message that includes a second portion of the additional information; and
appending the first portion of the additional information with the second portion of the additional information.

4. The method of claim 1, wherein generating supplemental information, further comprises:
aggregating the additional information included in the messages received from a plurality of users; and
comparing the additional information included in at least one message of the messages received from a plurality of users to at least one other message of the messages received from a plurality of users to determine an accuracy associated with the additional information included in the messages received from a plurality of users.

5. The method of claim 1, further comprising:
receiving user-generated content associated with the media asset at the event;
processing the user-generated content associated with the media asset to determine keywords in the user-generated content associated with the media asset at the event;
cross-referencing the keywords in a database of contexts for the keywords in user-generated content; and
determining the context of the event based on the cross-referenced keywords.

6. The method of claim 1, further comprising:
receiving object data associated with objects in the media asset at the event;
processing the object data using an object recognition module to determine the objects in the media asset at the event;
cross-referencing the object in a database of contexts for objects in media assets; and
determining the context of the event based on the cross-referenced object.

7. The method of claim 1, further comprising:
receiving audio data associated with the media asset at the event;
processing the audio data using a speech recognition module to determine keywords in the audio data associated with the media asset at the event;
cross-referencing the keywords in a database of contexts for the keywords in media assets; and
determining the context of the event based on the cross-referenced keywords.

8. The method of claim 1, further comprising:
receiving media data describing the media asset at the event;
cross-referencing the media data describing the media asset at the event in a database of contexts for media data in media assets; and
determining the context of the event based on the cross-referenced media data.

9. The method of claim 1, further comprising:
receiving subtitle data associated with the media asset at the event;
processing the subtitle data using a character recognition module to determine a keyword in the subtitle data associated with the media asset at the event;
cross-referencing the keyword in a database of contexts for keywords in media assets; and
determining the context of the event based on the cross-referenced keyword.

10. A system for providing supplemental content associated with a media asset, the system comprising control circuitry configured to:
transmit, to a plurality of users, a request for additional information regarding a context of an event in a media asset, wherein the event is a statement during the media asset, and wherein the additional information includes data used to determine a factual basis of the statement;
receive messages from the plurality of users that include the additional information;
generate supplemental information associated with the context of the event based on the messages, wherein the generated supplemental information is based on a comparison of the additional information included in the messages from the plurality of users; and
generate for display the generated supplemental information on a user device.

11. The system of claim 10, wherein the control circuitry is further configured to:
receive a user input from the user device for the supplemental information about the context of the event in the media asset;
determine the additional information required to generate the supplemental information about the context of the event in the media asset; and
generate the request for the additional information.

12. The system of claim 10, wherein the control circuitry is further configured to:
receive a first message that includes a first portion of the additional information;
receive a second message that includes a second portion of the additional information; and
append the first portion of the additional information with the second portion of the additional information.

13. The system of claim 10, wherein the control circuitry is further configured to:
aggregate the additional information included in the messages received from a plurality of users; and
compare the additional information included in at least one message of the messages received from a plurality of users to at least one other message of the messages received from a plurality of users to determine an accuracy associated with the additional information included in the messages received from a plurality of users.

14. The system of claim 10, wherein the control circuitry is further configured to:
receive user-generated content associated with the media asset at the event;
process the user-generated content associated with the media asset to determine keywords in the user-generated content associated with the media asset at the event;
cross-reference the keywords in a database of contexts for the keywords in user-generated content; and
determine the context of the event based on the cross-referenced keywords.

15. The system of claim 10, wherein the control circuitry is further configured to:
receive object data associated with objects in the media asset at the event;

process the object data using an object recognition module to determine the objects in the media asset at the event;
cross-reference the object in a database of contexts for objects in media assets; and
determine the context of the event based on the cross-referenced object.

16. The system of claim 10, wherein the control circuitry is further configured to:
receive audio data associated with the media asset at the event;
process the audio data using a speech recognition module to determine keywords in the audio data associated with the media asset at the event;
cross-reference the keywords in a database of contexts for the keywords in media assets; and
determine the context of the event based on the cross-referenced keywords.

17. The system of claim 10, wherein the control circuitry is further configured to:
receive media data describing the media asset at the event;
cross-reference the media data describing the media asset at the event in a database of contexts for media data in media assets; and
determine the context of the event based on the cross-referenced media data.

18. The system of claim 10, wherein the control circuitry is further configured to:
receive subtitle data associated with the media asset at the event;
process the subtitle data using a character recognition module to determine a keyword in the subtitle data associated with the media asset at the event;
cross-reference the keyword in a database of contexts for keywords in media assets; and
determine the context of the event based on the cross-referenced keyword.

19. A system for providing supplemental content associated with a media asset, the system comprising:
means for transmitting, to a plurality of users, a request for additional information regarding a context of an event in a media asset, wherein the event is a statement during the media asset, and wherein the additional information includes data used to determine a factual basis of the statement;
means for receiving messages from the plurality of users that include the additional information;
means for generating supplemental information associated with the context of the event based on the messages, wherein the generated supplemental information is based on a comparison of the additional information included in the messages from the plurality of users; and
means for generating for display the generated supplemental information on a user device.

20. The system of claim 19, further comprising:
means for receiving a user input from the user device for the supplemental information about the context of the event in a media asset;
means for determining the additional information required to generate the supplemental information about the context of the event in the media asset; and
means for generating the request for the additional information.

21. The system of claim 19, wherein the means for generating supplemental information further comprises:
means for receiving a first message that includes a first portion of the additional information;
means for receiving a second message that includes a second portion of the additional information; and
means for appending the first portion of the additional information with the second portion of the additional information.

22. The system of claim 19, wherein means for generating supplemental information, further comprises:
means for aggregating the additional information included in the messages received from a plurality of users; and
means for comparing the additional information included in at least one message of the messages received from a plurality of users to at least one other message of the messages received from a plurality of users to determine an accuracy associated with the additional information included in the messages received from a plurality of users.

23. The system of claim 19, wherein the means for determining the context of the event further comprises:
means for receiving user-generated content associated with the media asset at the event;
means for processing the user-generated content associated with the media asset to determine keywords in the user-generated content associated with the media asset at the event;
means for cross-referencing the keywords in a database of contexts for the keywords in user-generated content; and
means for determining the context of the event based on the cross-referenced keywords.

24. The system of claim 19, further comprising:
means for receiving object data associated with objects in the media asset at the event;
means for processing the object data using an object recognition module to determine the objects in the media asset at the event;
means for cross-referencing the object in a database of contexts for objects in media assets; and
means for determining the context of the event based on the cross-referenced object.

25. The system of claim 19, further comprising:
means for receiving audio data associated with the media asset at the event;
means for processing the audio data using a speech recognition module to determine keywords in the audio data associated with the media asset at the event;
means for cross-referencing the keywords in a database of contexts for the keywords in media assets; and
means for determining the context of the event based on the cross-referenced keywords.

26. The system of claim 19, further comprising:
means for receiving media data describing the media asset at the event;
means for cross-referencing the media data describing the media asset at the event in a database of contexts for media data in media assets; and
means for determining the context of the event based on the cross-referenced media data.

27. The system of claim 19, further comprising:
means for receiving subtitle data associated with the media asset at the event;
means for processing the subtitle data using a character recognition module to determine a keyword in the subtitle data associated with the media asset at the event;
means for cross-referencing the keyword in a database of contexts for keywords in media assets; and means for determining the context of the event based on the cross-referenced keyword.

\* \* \* \* \*